United States Patent [19]
Meckler

[11] 3,883,071
[45] May 13, 1975

[54] MIXING BOX AND CONTROL THEREFOR

[76] Inventor: Gershon Meckler, 2750 Ridge Valley Rd., Atlanta, Ga. 30327

[22] Filed: Dec. 18, 1972

[21] Appl. No.: 316,379

[52] U.S. Cl. ........................ 236/49; 98/38; 236/13
[51] Int. Cl. ...................... F24f 13/04; G05d 23/13
[58] Field of Search ..................... 236/13, 49; 98/38

[56] References Cited
UNITED STATES PATENTS

| | | | |
|---|---|---|---|
| 3,390,720 | 7/1968 | Meckler | 236/13 X |
| 3,611,908 | 10/1971 | Spoormaker | 98/38 E |

*Primary Examiner*—William E. Wayner
*Attorney, Agent, or Firm*—Owen & Owen Co.; John C. Purdue

[57] ABSTRACT

Air conditioning apparatus is disclosed. The apparatus can be a mixing box of the induction type, or a combined fluidic valve and induction box. In either case, the apparatus receives primary conditioned air, and delivers that air as required, for air conditioning. A signal is established which varies as a function of the air conditioning load on the zone served by the apparatus, and the rate at which primary conditioned air is delivered to the zone is varied between a maximum and a predetermined lesser rate as the air conditioning load on the space varies beween a maximum and an intermediate load. The apparatus also includes means for inducing a flow of air from outside, for mixing with primary conditioned air, so that such mixture is delivered to the zone. Preferably, the apparatus is effective to deliver to the zone such a mixture of primary, conditioned air and induced air under all conditions of air conditioning load on the zone. One fluidic valve induction box combination delivers such mixture only under conditions of comparatively low load on the zone.

9 Claims, 8 Drawing Figures

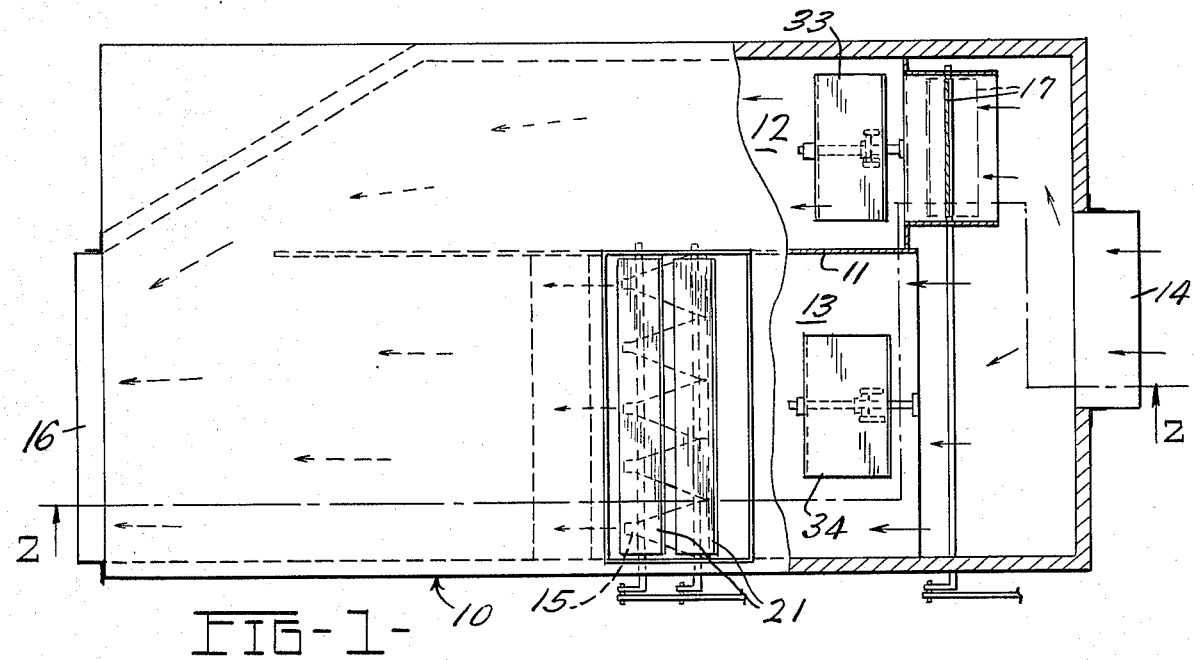
FIG-1-
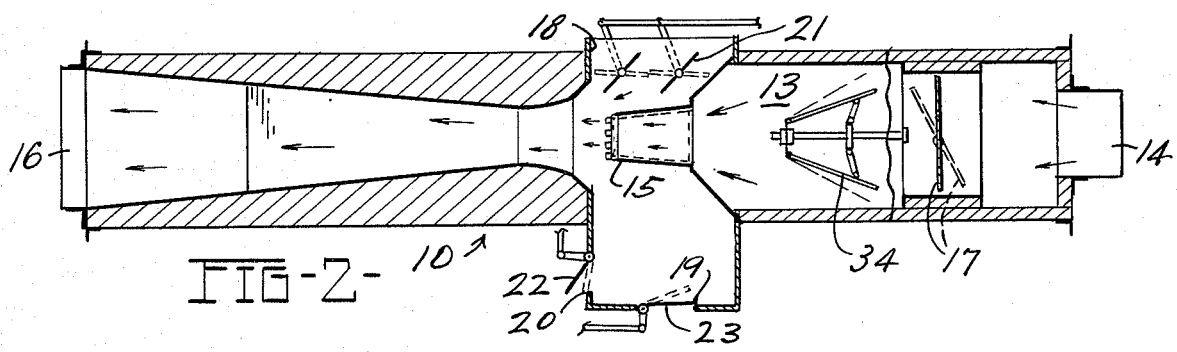
FIG-2-
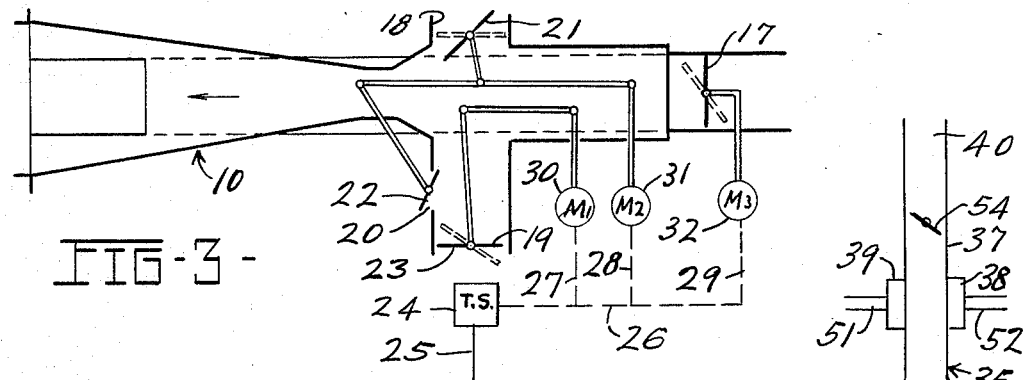
FIG-3-
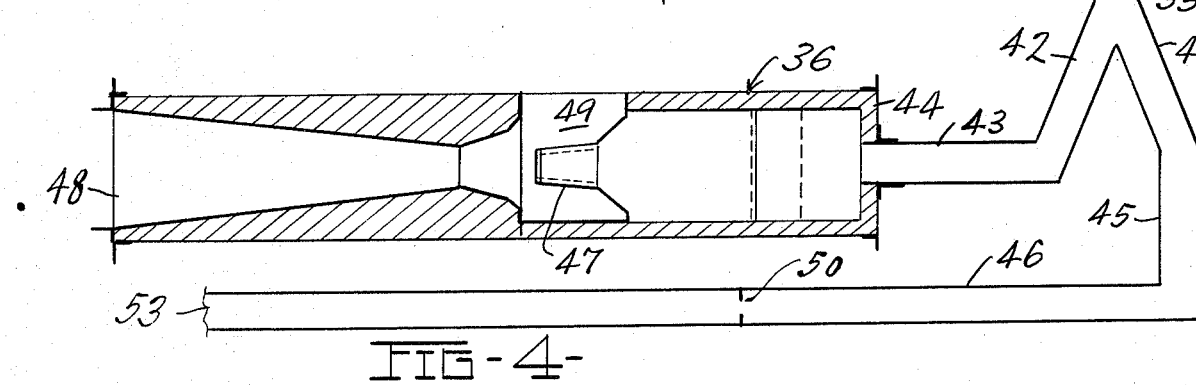
FIG-4-

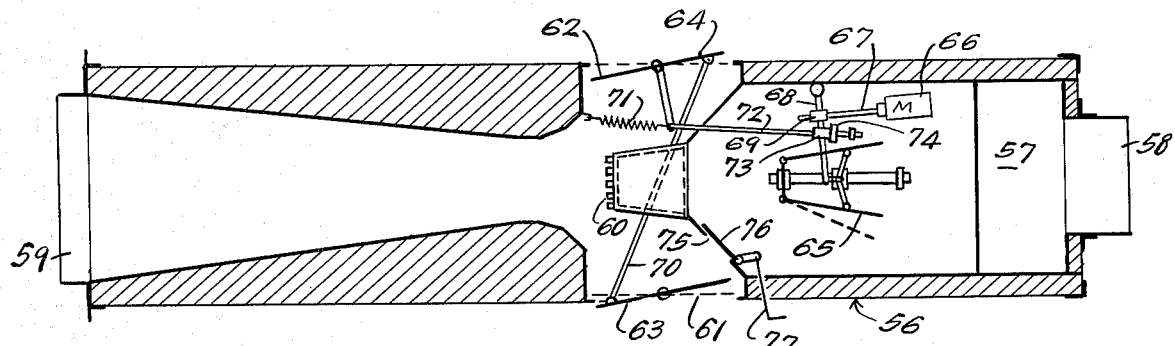
FIG-5-
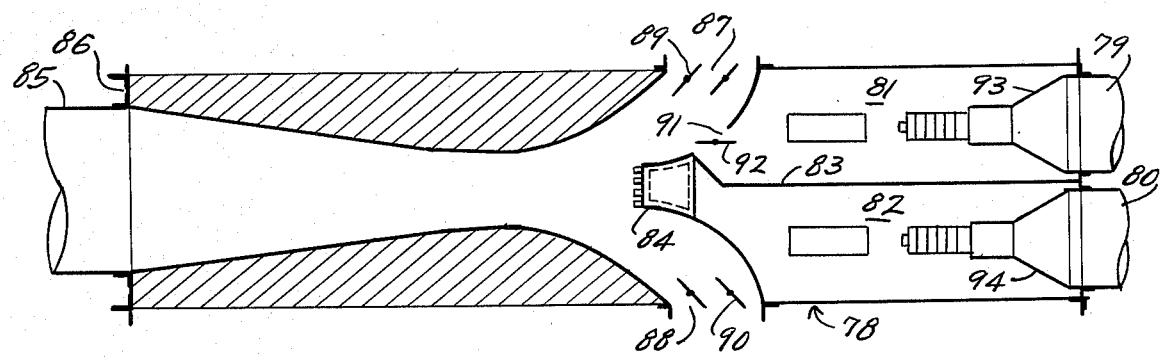
FIG-6-
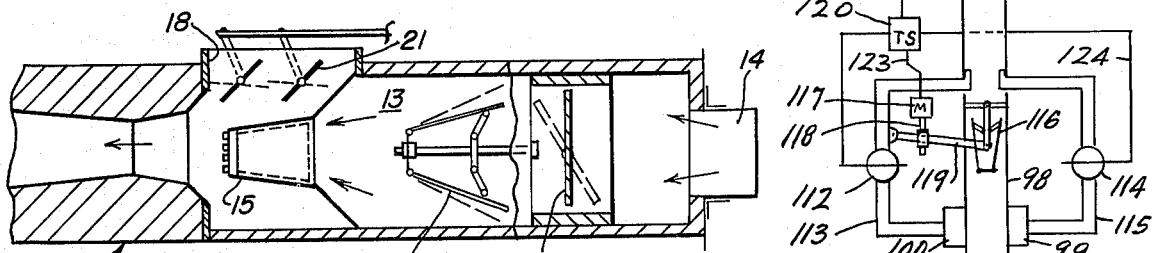
FIG-8-
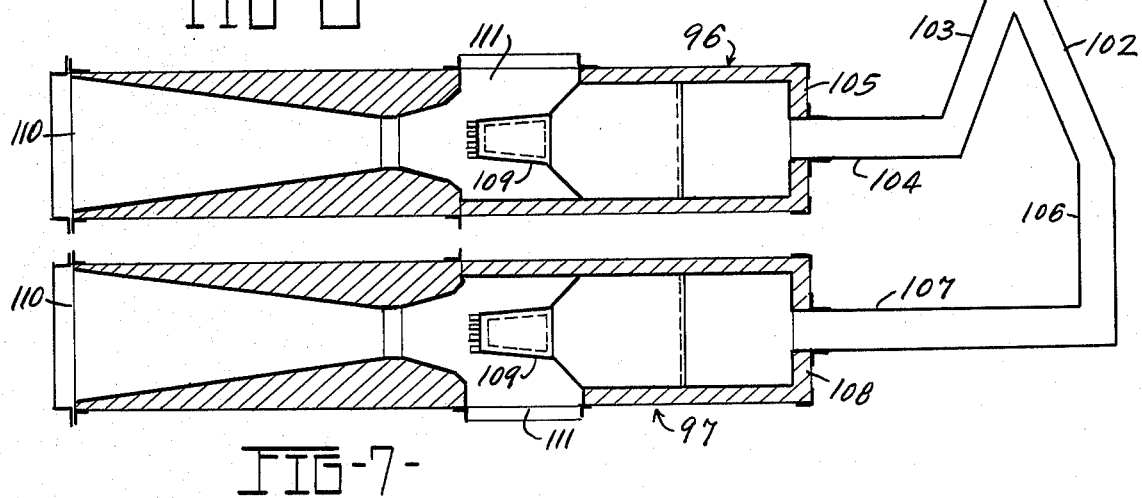
FIG-7-

MIXING BOX AND CONTROL THEREFOR

BACKGROUND OF THE INVENTION

The load in any given zone of an air conditioned building can vary substantially from time to time depending upon such factors as the occupancy of that zone at a given time, the load imposed by lights, computers, and other equipment that may be used within the zone, and the solar load that may be imposed upon the zone by solar energy transmitted thereinto through window openings. Accordingly, an effective air conditioning system must include some control means to enable the maintenance of a temperature within a desired range not withstanding variations in the air conditioning load which occur from time to time for the indicated and other reasons. There are numerous suggestions of mixing boxes* of the induction type that have been made. For example, the rate at which primary conditioned air is delivered to the mixing box can be varied, with a compensating variation in the rate at which a flow of air, for example from a plenum, is induced into the mixing box for mixture with the primary air, so that a mixture flows from the box at a substantially constant rate, but the temperature varies depending upon the proportions of primary conditioned air and induced air in the mixture. A mixing box has also been suggested where the flow of primary air induces a flow of warm air from a plenum, a flow of neutral air from the space, or a mixture of plenum air and room air, depending upon the positions of thermostatically controlled dampers, as well as that primary conditioned air can be by-passed around the induction portion of a mixing box to provide a maximum flow of primary conditioned air, with no induction for times of peak load on an air conditioning system.

* See, for example, U.S. Pat. Nos. 3,390,720; 3,516,606; 3,583,477; 3,604,625; 3,610,522 and 3,611,908.

The instant invention is based upon the discovery of improved air conditioning apparatus. The apparatus can be a mixing box of the induction type, or a combined fluidic valve and induction box. In either case, the apparatus receives primary conditioned air, and delivers that air as required, for air conditioning. A signal is established which varies as a function of the air conditioning load on the zone served by the apparatus, and the rate at which primary conditioned air is delivered to the zone is varied between a maximum and a predetermined lesser rate as the air conditioning load on the space varies between a maximum and an intermediate load. The apparatus also includes means for inducing a flow of air from outside, for mixing with primary conditioned air, so that such mixture is delivered to the zone. Preferably, the apparatus is effective to deliver to the zone such a mixture of primary, conditioned air and induced air under all conditions of air conditioning load on the zone. One fluidic valve induction box combination delivers such mixture only under conditions of comparatively low load on the zone.

OBJECTS OF THE INVENTION

It is an object of the invention to provide an improved mixing box of the induction type which includes a by-pass around the induction portion thereof.

It is a further object of the invention to provide an improved mixing box of the type described above, in combination with a control therefor.

BRIEF DESCRIPTION OF THE DRAWINGS

FIG. 1 is a plan view, with parts broken away to show details of the construction, of a mixing box according to the invention.

FIG. 2 is a vertical sectional view of the mixing box, taken along the line 2—2 of FIG. 1.

FIG. 3 is a schematic view of the mixing box, similar to FIG. 2, but showing details of a control therefor.

FIG. 4 is a schematic view of combined induction box fluidic valve apparatus which can be operated to perform a function similar to that of the mixing box of FIGS. 1–3.

FIG. 5 is a vertical sectional view of another embodiment of a mixing box according to the invention.

FIG. 6 is a partially schematic view in vertical section of still another embodiment of a mixing box according to the invention.

FIG. 7 is a schematic view of apparatus comprising a fluidic valve in combination with two induction boxes which can be operated to perform the same function as that of the mixing box of FIGS. 1–3.

FIG. 8 is a fragmentary vertical sectional view similar to FIG. 2, but showing yet another embodiment of a mixing box according to the invention.

DETAILED DESCRIPTION OF THE INVENTION

Referring to FIG. 1, a mixing box according to the invention is indicated generally at 10. The mixing box 10 is divided by a wall 11 into a by-pass passage 12 and a main passage 13. Air entering the mixing box 10 through an inlet 14 can flow through the passage 13 and induction nozzles 15 to an outlet end 16, or can flow both through the passage 13, as described, and through the by-pass passage 12, depending upon the setting of a damper 17.

Referring to FIG. 2, the flow of air through the passage 13 and the nozzles 15 tends to induce a flow of air through an opening 18, an opening 19, or an opening 20, depending upon the positions of dampers 21, 22 and 23. As shown in FIG. 2, the dampers 23 and 17 are closed, while the dampers 21 and 22 are open. These positions would be assumed during a time of minimum air conditioning load in a zone being served by the mixing box 10. The flow of primary conditioned air is at a minimum because of the closed position of the damper 17, and a maximum flow of air through the openings 18 and 20 is induced by the flow of primary conditioned air through the nozzles 15 because of the open positions of the dampers 21 and 22. In service, the mixing box 10 would be installed in a plenum, above the ceiling of a room, so that air flowing through the openings 18 and 20 would be from the plenum and might be, for example, at a temperature of about 85°F. to provide maximum reheating of the primary conditioned air. Under conditions varying from minimum load to an intermediate load in the zone served by the mixing box 10, the damper 17 would remain closed, and the dampers 21, 22 and 23 would be modulated, as required, to vary the relative proportions of induced air from the plenum and of induced air from the zone (flowing through the opening 19) to control zone temperature.

When the air conditioning load on the zone served by the mixing box 10 is high, the dampers 21 and 22 are closed, the damper 23 is opened, and the damper 17 is modulated to vary the amount of primary conditioned air flowing through the passage 12 to maintain a control condition.

Referring to FIG. 3, the mixing box 10 is shown schematically with operatively associated control apparatus to cause operation as described above. The control apparatus comprises a temperature sensor and controller 24 which receives compressed air from a source (not illustrated) through a line 25, and bleeds air from the line 25 into a control line 26 whenever the sensed temperature is above a control temperature of, say, 75°F. The temperature sensor and controller 24 can be set to control air pressure in the line 26 from a minimum of 1 psig. to a maximum of 12 psig. This pressure is transmitted through lines 27, 28 and 29 to motor controller and actuators 30, 31 and 32 which serve, respectively, the dampers 23, the dampers 21 and 22, and the damper 17. The motor controller and actuator 32 is set to close the damper whenever the air pressure in the line 26 is between the minimum and an intermediate value of, say, 6-½ psig. When the pressure in the line 26 is within this range, the motor controllers and actuators 30 and 31 modulate the dampers 21, 22 and 23 to positions varying from full open for the dampers 21 and 22 and full closed for the damper 23 at 1 psig. to full closed for the dampers 21 and 22 and full open for the damper 23 at 6-½ psig. Whenever the pressure in the line 26 is between 6-½ psig. and 12 psig. the motor controller and actuator 31 keeps the damper 23 open, while the motor controller and actuator 32 modulates the damper 17 from a full closed position at 6-½ psig. to a full open position at 12 psig.

It will be appreciated that the temperature sensor and controller 24 could be reversed, so that air is bled from the line 26 when the sensed temperature exceeds the control temperature, and to bleed air from the line 25 into the line 26 whenever the sensed temperature is below the control temperature. In this case, the operation of the motor controllers and actuators 30, 31 and 32 must be reversed to accomplish operation as described.

Referring again to FIG. 1, it will be noted that the mixing box 10 also includes two constant volume valves 33 and 34, the former in the by-pass passage 12, and the latter in the main passage 13. The constant volume valves 33 and 34 are advantageously of the mechanical type, for example loaded by a spring or by a weight, so that the valves open, i.e., move from the solid line position shown in FIG. 2 for the valve 34 in the direction of the dotted line position, and close, respectively, in response to increases and decreases in the pressure at the inlet end 14 of the mixing box 10. When the constant volume valves 33 and 34 are of this type, a substantially constant flow of air is provided in the main passage 13 of the mixing box 10, while a substantially constant flow is maintained in the by-pass passage 12 whenever the damper 17 is in its fully open position, and this flow is reduced or stopped altogether when the damper 17 is in other positions.

Referring again to FIG. 1, it will be noted that the by-pass passage 12 introduces air into the main passage 13 considerably downstream of the induction nozzles 15. This is an important feature of the mixing box 10. When air is flowing through the by-pass passage 12, the zone served by the mixing box 10 has a comparatively heavy load on the air conditioning system, and the need for induced air is at a minimum. Air from the by-pass passage 12, when it flows into the main passage 13, tends to cause a back pressure in the main passage 13; this back pressure minimizes induction, which is through the opening 19 when air is flowing through the by-pass passage 12. When the air conditioning load on the zone served by the mixing box 10 is low there is no air flowing through the by-pass passage 12 and there may be, under certain conditions of operation, a need for a greater flow of induced air, particularly through the openings 18 and 20.

Referring to FIG. 4, apparatus comprising a combined fluidic valve* 35 and an induction box 36 is shown. The fluidic valve 35 comprises a duct 37 having opposed pressure chambers 38 and 39 downstream of an inlet end 40. Downstream of the pressure chambers 38 and 39 the duct 37 splits into two ducts 41 and 42 which diverge from one another in the direction of fluid flow. The duct 42 is connected, through a duct 43, to an inlet end 44 of the induction box 36, while the duct 41 is connected to ducts 45 and 46. The induction box 36 has induction nozzles 47. Air flowing through the induction box 36, from the inlet end 44 to an outlet end 48, flows through the induction nozzles 47, and induces a flow of air from outside the box 36 through an opening 49. There is an orifice plate 50 in the duct 46 to balance air flows under some conditions of operation, as subsequently discussed.

* For a simple explanation of fluidic valves, see Air Conditioning and Refrigeration Business, pages 49 and following, July, 1971.

The fluidic valve 35 controls the flow of air, primary, conditioned air for an air conditioning system in the apparatus of FIG. 4, to the duct 42 or to the duct 41. When compressed air from a source (not illustrated) is introduced into the chamber 39 through a line 51, this air flow is through the ducts 42 and 43 to the inlet end 44 of the induction box 36, and through the induction box 36 to the outlet end 49 thereof. On the other hand, when compressed air from a source (not illustrated) is introduced into the chamber 38 through a line 52, the air flow is through the ducts 41, 45 and 46 to an outlet end 53 of the duct 46.

The apparatus of FIG. 4 can be used to maintain a control temperature in a zone of a building, notwithstanding substantial variations in the air conditioning load. At times when the load is comparatively high, compressed air is introduced into the pressure chamber 38 through the line 52 to cause primary conditioned air to flow from the inlet end 40 of the fluidic valve 35 to the outlet end 53 of the duct 40 and from thence through suitable air handling apparatus (not illustrated) to the zone in question. So long as the air conditioning load is comparatively heavy, a damper 54 is modulated to maintain the control temperature merely by varying the amount of primary conditioned air delivered to the zone. However, an air conditioning system must deliver air to each zone of a building at a rate sufficient to provide adequate ventilation. This usually requires about 0.6 cubic foot per minute of air per square foot of floor space. Accordingly, so long as compressed air is furnished to the pressure chamber 38, as described, the valve 54 cannot be closed enough to reduce the flow of air below the minimum required for ventilation. When this minimum flow of primary conditioned air lowers the temperature of the zone served below a control temperature, the delivery of compressed air to the pressure chamber 38 is discontinued, so that the flow of air is in part through the ducts 42 and 43 to the mixing box 36, and in part through the ducts 41, 45 and 46. Under this condition of operation a flow of air is induced, for example from a plenum above the zone being served, through the opening 49 for mixture with the primary conditioned air delivered from the discharge end 48 of the mixing box 36 and from thence through suitable air handling apparatus (not illustrated) to the zone. As a practical matter, the induction box 36 can induce plenum air, for example, at a rate up to about one and one-half times that at which primary conditioned air is flowing through the induction box 36. Accordingly, in this mode of operation, air is delivered to the zone, in part from the mixing box 36 and in part from the duct 46, at a rate which is more than adequate for ventilation. Under this mode of operation the orifice plate 50 balances air flows and pressures at the outlet ends 48 and 53 of the box 36 and of the duct 46, respectively. Accordingly, the valve 54 can be throttled further, until the mixture of primary conditioned air and induced air is no longer adequate for ventilation. When this limit is reached, the pressure chamber 39 is pressurized by compressed air from the line 51 to cause all of the primary conditioned air to flow through the mixing box 36, thereby increasing the amount of air induced, for example from a plenum, through the opening 49. Further throttling of the valve 54 is then possible until the mixture of primary air and induced air delivered at the discharge end 48 of the induction box 36 is reduced to the minimum required for ventilation of the zone being served.

The apparatus of FIG. 4 is advantageously used in conjunction with apparatus which enables control of the temperature of the air induced by the mixing box 36 through the opening 49. Lighting fixtures having controlled means for selectively transferring heat to a heat sink can be used for this purpose. For example, lighting fixtures can be used which have conduits through which water is circulated to transfer heat from the lights to a heat sink, except when the minimum flow of air required for ventilation from the discharge end 48 of the induction box 36 lowers the temperature in the zone being served below a control temperature. By stopping the circulation of water through the lighting fixtures in response to a signal indicating the condition just stated, the temperature of the plenum air can be increased substantially by heat transfer from the lighting fixtures, either directly from portions of the fixtures exposed to the plenum, or indirectly through room air circulated through the lighting fixtures.

It will be appreciated that automatic control apparatus of the type described above in connection with FIG. 3 can be utilized to control much of the operation of the FIG. 4 apparatus. For example, the damper 54 can be modulated between a full open position and a minimum open position in response to a signal, for example compressed air pressure, indicating an air conditioning load on the zone being served varying from maximum to light, and heat transfer from lighting fixtures to a heat sink can be controlled in response to a signal indicating an air conditioning load from light to minimum to cause an increase in the temperature of induced air, as required. Similarly, valves (not illustrated) in the compressed air lines 51 and 52 can be controlled to pressurize the chamber 38 in response to a signal indicating that the air conditioning load on the zone being served is from maximum to intermediate, and to pressurize the chamber 39 in response to a signal indicating that the air conditioning load is from minimum to light, neither of the chambers 38 and 39 being pressurized when the load is light to intermediate.

It will be appreciated from the foregoing description of the operation of the apparatus of FIG. 4 that a somewhat simplified version of the mixing box 10 of FIGS. 1 and 2 can be used to provide effective temperature control in systems where means are provided for changing plenum temperature. Such a mixing box 10' is shown in FIG. 8, where the same reference numerals used in FIG. 2 designate like parts. The openings 19 and 20 and their dampers 22 and 23, as well as the associated controllers and actuators shown in FIG. 3 have been eliminated from the box 10' of FIG. 8. The bypass damper 17 and the damper 21 are operated as described above and, under conditions of comparatively light air conditioning load, the temperature of the air induced through the opening 18 can be controlled as described above in connection with FIG. 4.

Referring to FIG. 5, another embodiment of a mixing box according to the invention is indicated generally at 56. The mixing box 56 has a single passage 57 extending therethrough from an inlet end 58 to an outlet end 59. Air flowing through the passage 57 passes through induction nozzles 60 to induce a flow of air from outside the box 56 through an opening 61, an opening 62, or both, depending upon the positions of dampers 63 and 64. The rate at which air flows through the mixing box 56 under operating conditions is controlled by a constant flow valve 65 which is driven between a closed position shown in dotted lines to minimize air flow and an open position shown in solid lines to increase air flow. As shown in FIG. 5, a motor 66 is used, through its rod 67, and a hinged rod 68 to which the rod 67 is attached by a collar 69, to drive the valve 65, as described.

The dampers 63 and 64 are connected by a rod 70, so that they move together in opposition, and are urged by a spring 71 toward a position in which the damper 64 is closed, and the damper 63 is open. The mixing box 56 also includes a damper actuator 72 which is slidably engaged through a collar 73 with the hinged rod 68. The actuator 72 also has a collar 74 which, in the position shown, bears against the collar 73 so that the dampers 63 and 64 are held in the positions shown against the action of the spring 71. When the motor 66 moves the valve 65 by driving the hinged rod 68 to the left, thereby further opening the valve 65 and increasing the rate at which air flows through the mixing box 56, the spring 71 moves the damper 64 toward a closed position, and the damper 63 toward an open position until the damper 63 is fully open, and the damper 64 is fully closed. Further movement of the hinged rod 68 to the left does not then affect the positions of the dampers 63 and 64, the rod 72 merely sliding through the collar 73, so that the stop 74 slides away therefrom to the right. Conversely, when the motor 66 moves the valve 65 toward a closed position, the damper 64 is moved toward an open position and the damper 63 is moved toward a closed position, the limiting positions being fully open for the damper 64 and fully closed for the damper 63.

It will be appreciated that the motor 66 can be controlled by a signal, for example compressed air as described above in connection with FIG. 3, which is a function of the air conditioning load on the zone being served by the mixing box to increase or decrease the rate at which primary conditioned air is supplied and, accordingly, to maintain a control temperature. It will also be appreciated that the particular damper arrangement and linkage of the mixing box 56 will enable operation substantially as described for the mixing box 10 of FIGS. 1 and 2 with control, as indicated, only of the motor 66 of FIG. 5.

The mixing box 56 also has a by-pass opening 75 around the induction nozzles 60. The flow of air through the opening 75 is controlled by a damper 76, which is shown in the closed position, and as having a manual control 77 to enable opening of the damper 76 when more cooling is required, and vice versa. It will be appreciated that the damper 76 can also be automatically controlled, for example in the manner described above for the operation of the damper 17 of the mixing box 10 shown in FIGS. 1 and 2.

Referring to FIG. 6, a mixing box which is similar in operation to the mixing box 10 of FIGS. 1 and 2 is indicated generally at 78. The mixing box 78 has two inlets, 79 and 80 for primary conditioned air. Primary air introduced into the mixing box 78 through the inlet 79 enters a passage 81, while air introduced through the inlet 80 enters a passage 82. The passages 81 and 82 are separated from one another by an interior wall 83. Air entering the passage 82 flows through induction nozzles 84 and discharges from the mixing box 78 into a supply air duct 85 which is connected with a discharge end 86 thereof. The flow of air through the induction nozzles 84 tends to cause a flow of induced air through an opening 87, an opening 88, or both, depending upon the positions of dampers 89 and 90. Air flow from the passage 81 of the mixing box 78, through an opening 91, is controlled by a damper 92. Air which flows from the passage 81 through the opening 91 is mixed with air from the passage 82 flowing through the induction nozzles 84 and with any air that is being induced through the openings 87 and 88, and is discharged into the supply air duct 85.

The dampers 89, 90 and 92 can be controlled as described above to operate in the same manner as the dampers 21 and 22, 23 and 17, respectively, FIGS. 1–3. Similarly, constant volume valves 93 and 94 in the passages 81 and 82, respectively, of the mixing box 78 of FIG. 6 control air flow in the same manner as do the valves 33 and 34, FIGS. 1 and 2.

Referring to FIG. 7, apparatus comprising a combined fluidic valve 95 and induction boxes 96 and 97 is shown. The fluidic valve 95 comprises a duct 98 having opposed pressure chambers 99 and 100 downstream of an inlet end 101. Downstream of the pressure chambers 99 and 100 the duct 98 splits into two ducts 102 and 103 which diverge from one another in the direction of fluid flow. The duct 103 is connected, through a duct 104, to an inlet end 105 of the induction box 96, while the duct 102 is connected through ducts 106 and 107 to an inlet end 108 of the induction box 97. The induction boxes 96 and 97 are similar, both having induction nozzles 109. Air flowing through the induction boxes 96 and 97 from the inlet ends 105 and 108, respectively, to outlet ends 110 flows through the induction nozzles 109, and induces a flow of air from outside the boxes 96 and 97 through openings 111.

The fluidic valve 95 controls the flow of air through the mixing box 96, through the mixing box 97, or through both, in the manner described above in connection with FIG. 4, except that, in the FIG. 7 apparatus, primary conditioned air flowing within the duct 98 is used to pressurize the chamber 99 or the chamber 100, when required. The chamber 100 is pressurized whenever a valve 112 is open to enable a flow of primary conditioned air from the duct 98 to the chamber 100, while the chamber 99 is pressurized whenever a valve 114 is open to enable a flow of air from inside the duct 98 through a line 115 to the chamber 99. The rate at which primary conditioned air flows through the duct 98 and is delivered to the mixing box 96, to the mixing box 97, or to both is controlled by a constant volume valve 116, under the control of motor controller 117, which is operatively associated therewith through a motor controller 117, its rod 118, and a hinged rod 119.

In operation, the apparatus of FIG. 7 can be installed so that the opening 111 of the mixing box 97 receives room air from a zone being served by the apparatus, while the opening 111 of the box 96 receives plenum air. Under conditions of heavy air conditioning load the valve 112 is closed, the valve 114 is open, and the constant volume valve 116 is modulated by the motor controller 117 to maintain a control temperature. This is the preferred mode of operation until a minimum position is reached for the valve 116 at which the air flow to the space is just adequate for ventilation. When the valve 116 is in its minimum position and the air conditioning load on the space is sufficiently low that a temperature below a control temperature is sensed, temperature is advantageously controlled by dividing the flow of primary conditioned air between the mixing boxes 96 and 97. Such division of primary air flow can be accomplished in any of several ways. For example, the valve 112 can remain closed, and the valve 114 can be modulated between a full open and a full closed position for what can be called "medium heavy" loads, while the valve 112 is in a full open position and the valve 114 is modulated between an open position and a closed position for what may be denominated "light heavy" air conditioning loads. This way of operating the apparatus of FIG. 7 is summarized in the following Table:

| Load | Position of the Valves | | | Limiting Conditions | Control |
| | 112 | 114 | 116 | | |
| --- | --- | --- | --- | --- | --- |
| Heavy | Closed | Open | M* | Minimum air for ventilation | Modulation of the valve 116 |
| Medium heavy | M | Open | Minimum | Full open position for the valve 112 | Modulation of the valve 112 |
| Light heavy | Open | M | Minimum | Full closed position for the valve 114 | Modulation of the valve 114 |

*Modulated for control

As shown in FIG. 7, a temperature sensor and controller 120 can be used to control the valves 112 and 114, and the motor 117. The temperature sensor and controller 120 can be of the same type as that described in connection with FIG. 3, which receives compressed air from a line 121 and maintains a pressure in lines 122, 123 and 124 which varies as a function of air conditioning load on the space, as described. The motor 117 is driven, as required, in response to a pressure indicating a "heavy" load. The valve 112 is closed in response to an air pressure indicating a "heavy" load, is modulated, as required, in response to air pressure indicating a "medium heavy" load, and is open in response to an air pressure indicating a "light heavy" load. The valve 114 is open in response to an air pressure indicating either a "heavy" or a "medium heavy" load, and is modulated in response to an air pressure indicating a "light heavy" load.

It is advantageous, as discussed above, to use the apparatus of FIG. 7 in connection with a system which includes means for controlling the temperature of the air induced through the opening 111 of the box 96 whenever the valve 112 is open, and the valve 114 reaches a fully closed position. Such control can be accomplished by using lighting heat, as described.

The apparatus of FIG. 7 is also capable of different modes of operation, particularly in the "light heavy " to "medium heavy" load ranges. For example, at comparatively heavy loads within these ranges, flow can be alternated between all air through the box 97 and an equal division of air between the boxes 96 and 97, while at comparatively light loads within this range flow can be alternated between all flow through the box 96 and an equal division of flow through the boxes 96 and 97. The equal division of air can be accomplished either by opening both of the valves 112 and 114 or by closing both of the valves 112 and 114. A somewhat simplified fluidic valve can be used in connection with the mode of operation just described. Specifically, the pressure chambers 99 and 100, the lines 113 and 115 and the valves 112 and 114 can all be eliminated, and the duct 98 can merely be opened to the atmosphere at the region where the pressure chambers 99 and 100 are shown in FIG. 7. Dampers (not illustrated) in these openings can then be used to control the flow of air through the fluidic valve. When both dampers are open and when both dampers are closed, the flow of primary conditioned air is divided approximately equally between the two induction boxes. When either damper is closed and the other is open, the flow of primary conditioned air will be diverted to the side of the closed damper.

It will be appreciated that the two induction boxes 96 and 97 shown in FIG. 7 can be made as a single unit, and that the two passages in the single unit could be either side-by-side or one above the other, depending upon the availability of space within a plenum of a building to be air conditioned.

What I claim is:

1. A mixing box defining a substantially closed passage for the flow of air from an inlet end to an outlet end thereof, nozzle means intermediate the inlet and outlet ends of the mixing box, there being three openings through which air can flow from the exterior of the mixing box into the closed passage, the openings being so positioned that air flowing through said nozzle means induces a flow of air from the exterior of the mixing box through the openings and into the closed passage, a damper for each of the openings, each of said dampers being movable between an open position in which it is ineffective, and a closed position in which it is effective, to prevent flow of air through the openings, means defining a by-pass passage through which air can flow from the inlet end to the outlet end of the mixing box without passing through said nozzle means, a by-pass damper movable between an open position in which it is ineffective, and a closed position in which it is effective, to prevent flow of air through the by-pass passage, at least one actuator for said dampers and for said by-pass damper, said by-pass damper and the actuator therefor being effective, in response to a control signal indicating an air conditioning load between a minimum and an intermediate magnitude, to close said by-pass damper and, in response to a control signal indicating an air conditioning load between the intermediate and a maximum magnitude, to move said by-pass damper toward an open position, said dampers and the actuator for each being effective, in response to a control signal indicating an air conditioning load above the intermediate magnitude to open a first one and to close the others of said dampers, and, in response to a signal indicating an air conditioning load between the minimum and the intermediate magnitude to move the first two of said dampers toward an open position and the third of said dampers toward a closed position.

2. Apparatus for delivering air for air conditioning a zone of a building, said apparatus comprising in combination, means for receiving primary, conditioned air, and for delivering that air to the zone, means responsive to the temperature of the zone, and effective to generate a signal which varies as a function of the air conditioning load on the zone, means responsive to the signal and effective to vary the rate at which primary conditioned air is delivered to the zone between a maximum and a predetermined lesser rate as the air conditioning load on the space varies between a maximum and an intermediate load, and means for inducing a flow of air from outside said apparatus in two separate streams for mixing such induced air with primary, conditioned air, and for delivering such mixture to the zone, damper means movable between an open ineffective position and a closed effective position to prevent the flow of air in each of the two separate streams, at least one damper actuator responsive to the signal and effective to position said damper in the open position for a first one of the streams and in the closed position for the second in response to a signal indicating an air conditioning load from the maximum to the intermediate, to position said damper in the open position for the second stream and in the closed position for the first stream in response to a signal indicating a minimum air conditioning load, and to position said damper at positions intermediate between open and closed for the second stream in response to signals indicating a load between the minimum and the intermediate loads.

3. Apparatus for delivering air for air conditioning a zone of a building, said apparatus comprising, in combination, means for receiving primary, conditioned air, and for delivering that air to the zone, means responsive to the temperature of the zone, and effective to generate a signal which varies as a function of the air conditioning load on the zone, means responsive to the signal and effective to vary the rate at which primary conditioned air is delivered to the zone between a maximum and a predetermined lesser rate as the air conditioning load on the space varies between a maximum and an intermediate load, means for inducing a flow of air from outside said apparatus in first and second separate streams for mixing such induced air with primary, conditioned air, and for delivering such mixture to the zone, damper means movable between an open ineffective position and a closed effective position to prevent the flow of air in each of the two separate streams, and at least one damper actuator responsive to the signal and effective to position and damper in the open position for the second stream and in the closed position for the first stream in response to a signal indicating a minimum air conditioning load, and to position said damper at positions intermediate between open and closed for the second stream in response to signals indicating a load between the minimum and the intermediate loads, and to position said damper in the closed position for the second stream in response to a signal indicating an air conditioning load from the maximum to the intermediate.

4. Apparatus for delivering air for air conditioning a zone of a building, said apparatus comprising, in combination, means for receiving primary, conditioned air, and for delivering that air to the zone, means responsive to the temperature of the zone, and effective to generate a signal which varies as a function of the air conditioning load on the zone, means responsive to the signal and effective to vary the rate at which primary conditioned air is delivered to the zone between a maximum and a predetermined lesser rate as the air conditioning load on the space varies between a maximum and an intermediate load, and to control the rate at which primary conditioned air is delivered to the zone to the predetermined lesser rate as the air conditioning load on the space varies between the intermediate load and a minimum load, means for inducing a flow of air form outside said apparatus in first and second separate streams, for mixing such induced air with primary, conditioned air, and for delivering such mixture to the zone, damper means movable between an open ineffective position and a closed effective position to prevent the flow of air in each of the two separate streams, and at least one damper actuator responsive to the signal and effective to position said damper in the open position for the second stream and in the closed position for the first stream in response to a signal indicating the minimum air conditioning load, to position said damper at positions intermediate between open and closed for the second stream in response to signals indicating a load between the minimum and the intermediate loads, and to position said damper in the closed position for the second stream in response to a signal indicating an air conditioning load from the maximum to the intermediate.

5. Apparatus for delivering air for air conditioning a zone of a building, said apparatus comprising, in combination, means for receiving primary, conditioned air, and for delivering that air to the zone, means responsive to the temperature of the zone, and effective to generate a signal which varies as a function of the air conditioning load on the zone, means responsive to the signal and effective to vary the rate at which primary conditioned air is delivered to the zone between a maximum and a predetermined lesser rate as the air conditioning load on the space varies between a maximum and an intermediate load, means for inducing a flow of air from outside said apparatus in first and second separate streams, for mixing such induced air with primary, conditioned air, and for delivering such mixture to the zone, and means responsive to the signal and operable to control the rate of flow of induced air in the first and second streams up to a predetermined maximum, said last-named means being effective to prevent the flow of induced air in the first stream and to enable the maximum flow of induced air in the second stream in response to a signal indicating a minimum air conditioning load, and to vary the flow of induced air in the second stream at rates between the maximum and zero in response to signals indicating a load between the minimum and the intermediate loads, and to prevent the flow of induced air in the second stream in response to signals indicating a load between the intermediate and the maximum loads.

6. Apparatus for delivering air for air conditioning a zone of a building, said apparatus comprising, in combination, means for receiving primary, conditioned air, and for delivering that air to the zone, means responsive to the temperature of the zone, and effective to generate a signal which varies as a function of the air conditioning load on the zone, means responsive to the signal and effective to vary the rate at which primary conditioned air is delivered to the zone between a maximum and a predetermined lesser rate as the air conditioning load on the space varies between a maximum and an intermediate load, and to control the rate at which primary conditioned air is delivered to the zone to the predetermined lesser rate as the air conditioning load on the space varies between the intermediate load and a minimum load, means for inducing a flow of air from outside said apparatus in first and second separate streams, for mixing such induced air with primary, conditioned air, and for delivering such mixture to the zone, and means responsive to the signal and operable to control the rate of flow of induced air in the first and second streams up to a predetermined maximum, said lastnamed means being effective to prevent the flow of induced air in the first stream and to enable the maximum flow of induced air in the second stream in response to a signal indicating the minimum air conditioning load, and to vary the flow of induced air in the second stream at rates between the maximum and zero in response to signals indicating a load between the minimum and the intermediate loads, and to prevent the flow of induced air in the second stream in response to signals indicating a load between the intermediate and the maximum loads.

7. Apparatus for delivering air for air conditioning a zone of a building, said apparatus comprising, in combination, means for receiving primary, conditioned air, and for delivering that air to the zone, means responsive to the temperature of the zone, and effective to generate a signal which varies as a function of the air conditioning load on the zone, means responsive to the signal and effective to vary the rate at which primary conditioned air is delivered to the zone between a maximum and a predetermined lesser rate as the air conditioning load on the space varies between a maximum and an intermediate load, and to control the rate at which primary conditioned air is delivered to the zone to the predetermined lesser rate as the air conditioning load on the space varies between the intermediate load and a minimum load, means for inducing a flow of air from outside said apparatus in first and second separate streams, for mixing such induced air with primary, conditioned air, and for delivering such mixture to the zone, damper means movable between an open ineffective position and a closed effective position to prevent the flow of air in each of the two separate streams, at least one damper actuator responsive to the signal and effective to position said damper in the open position for the second stream and in the closed position for the first stream in response to a signal indicating a minimum air conditioning load, to position said damper at positions intermediate between open and closed for the second stream and at positions intermediate between closed and open for the first stream, in response to signals indicating a load between the minimum and the intermediate loads, and to position said damper in the closed position for the second stream in response to a signal indicating an air conditioning load from the maximum to the intermediate.

8. Apparatus for delivering air for air conditioning a zone of a building, said apparatus comprising, in combination, means for receiving primary, conditioned air, and for delivering that air to the zone, means responsive to the temperature of the zone, and effective to generate a signal which varies as a function of the air conditioning load on the zone, means responsive to the signal and effective to vary the rate at which primary conditioned air is delivered to the zone between a maximum and a predetermined lesser rate as the air conditioning load on the space varies between a maximum and an intermediate load, and to control the rate at which primary conditioned air is delivered to the zone to the predetermined lesser rate as the air conditioning load on the space varies between the intermediate load and a minimum load, means for inducing a flow of air from outside said apparatus in first and second separate streams, for mixing such induced air with primary, conditioned air, and for delivering such mixture to the zone, and means responsive to the signal and operable to control the rate of flow of induced air in the first and second streams up to a predetermined maximum, said lastnamed means being effective to prevent the flow of induced air in the first stream and to enable the maximum flow of induced air in the second stream in response to a signal indicating the minimum air conditioning load, to vary the flow of induced air in the second stream at rates between the maximum and zero in response to signals indicating a load between the minimum and the intermediate loads, to vary the flow of induced air in the first stream at rates between the maximum and zero in response to signals indicating a load between the intermediate and the minimum loads, and to prevent the flow of induced air in the second stream in response to signals indicating a load between the intermediate and the maximum loads.

9. Apparatus for delivering air for air conditioning a zone of a building, said apparatus comprising in combination, means for receiving primary, conditioned air, and for delivering that air to the zone, means responsive to the temperature of the zone, and effective to generate a signal which varies as a function of the air conditioning load on the zone, means responsive to the signal and effective to vary the rate at which primary conditioned air is delivered to the zone between a maximum and a predetermined lesser rate as the air conditioning load on the space varies between a maximum and an intermediate load, means for inducing a flow of air from outside said apparatus in two separate streams, for mixing such induced air with primary, conditioned air, and for delivering such mixture to the zone, and means responsive to the signal and operable to control the rate of flow of induced air in the first and second streams up to a predetermined maximum, said lastnamed means being effective to prevent the flow of induced air in the second stream and to enable the maximum flow of induced air in the first stream in response to a signal indicating an air conditioning load from the maximum to the intermediate, to prevent the flow of induced air in the first stream and to enable the maximum flow of induced air in the second stream in response to a signal indicating the minimum air conditioning load, and to vary the flow of induced air in the second stream at rates between the maximum and zero in response to signals indicating a load between the minimum and the intermediate loads.

* * * * *